United States Patent Office 3,405,101
Patented Oct. 8, 1968

3,405,101
PYROMELLITONITRILE/AMMONIA
REACTION PRODUCTS
Bernard S. Wildi, Bethesda, Md., assignor to Monsanto
Company, a corporation of Delaware
No Drawing. Filed June 15, 1964, Ser. No. 375,343
The portion of the term of the patent subsequent to
Jan. 12, 1981, has been disclaimed
2 Claims. (Cl. 260—78.4)

ABSTRACT OF THE DISCLOSURE

Pyromellitonitrile/ammonia reaction product having a molar ratio of pyromellitonitrile to ammonia of about 1:2, the reaction being carried out at a temperature insufficient to cause substantial pyrolysis of the reaction product; and prolyzed reaction products thereof made at a temperature and range of 180–700° C. sufficient to drive off ammonia and give product having improved semiconductor properties.

This invention relates to the reaction product of about 2 moles of ammonia per mole of pyromellitonitrile and to pyrolysis products thereof having a semiconductor properties.

In U.S. 3,132,039 are described the making of the reaction product of ammonia and pyromellitonitrile which is useful to treat web, for example cloth, paper or the like, to obtain a heat responsive recording sheet. The web treated with the reaction product is claimed in the patent and we have now discovered that the ammonia/pyromellitonitrile reaction product is useful as an intermediate to make pyrolyzed products having good semiconductor properties.

It is an object of this invention to make a new semiconductor intermediate which is ammonia/pyromellitonitrile reaction product have a ratio of about 2 moles of ammonia per mole of pyromellitonitrile.

It is another object of this invention to make pyrolyzed ammonia/pyromellitonitrile reaction products which are useful as organic semiconductor materials.

These and other objects of the invention will become apparent as the detailed description of the invention proceeds.

The pyromellitonitrile/ammonia reaction products of the invention can be made by contacting pyromellitonitrile and ammonia at temperatures in the range of about 0° C. to about 180° C., preferably a temperature in the range of about 20° C. to about 150° C. It is convenient to make the reaction product by contacting the pyromellitonitrile dissolved in a lower alkyl alcohol such as methanol or ethanol with ammonia; however, the ammonia reaction product can be made in the absence of an alcohol or other solvent medium. It is also convenient to use liquid ammonia as the solvent medium for the pyromellitonitrile. A small amount of catalyst such as sodium to speed the reaction can be used but is not necessary. Although the reaction product can be produced using a 2:1 or lower molar ratio of ammonia to nitrile, it is preferred to use a large excess of ammonia over this 2:1 ratio to more quickly drive the reaction to completion. Conveniently the ammonia is reacted with the pyromellitonitrile by bubbling ammonia gas through a refluxing solution of pyromellitonitrile dissolved in lowed alkyl alcohol. At the boiling point of methanol or ethanol the reaction proceeds to completion producing a good yield of reaction product in a relatively short time. The reaction should not be carried out at temperatures substantially above 180° C. and is preferably carried out at temperatures below 180° C., at which temperature the reaction product begins to pyrolyze.

The pyrolyzed product is produced by heating the reaction product at a temperature in the range of about 180 to 700° C. sufficient to drive off ammonia, producing a product having improved semiconductor properties. The pyrolyzed reaction product can be varied considerably in semiconductor properties depending on the amount of ammonia that is driven off. It may be desirable to produce a pyrolyzed product of a certain resistivity, in which case several experiments would be necessary to produce products having both higher and lower resistivities than the resistivity of the desired product in order to estimate how much time at a certain prolysis temperature was needed to produce the pyrolyzed product of the desired resistivity. The higher the pyrolysis temperature, of course, the shorter will be the required time of heating to produce a desired pyrolyzed product. Depending on the temperature, the heating time may vary from a few hours or less to a number of days. The pyrolyzed product has an appreciably lower resistivity than the reaction product itself, especially at higher temperatures of about 100° C. or more. Also, the temperature and time of heating can be varied to produce a product having improved thermoelectric properties, such as increased thermoelectric power. It is preferred that the pyrolyzed product be poduced by heating in an inert atmosphere, which is defined to include high vacuum, or e.g. a nitrogen atmosphere; however, pyrolyzed products having improved semiconductor properties can be produced by heating in air.

Pellets can be formed from the reaction product without the use of a binder using sufficient pressure to fuse the powdered material into a pellet of desired strength and, if desired, heat can be applied during the pelletted operation to aid in the formation of the pellets, but heating is not necessary. Pellets are somewhat more difficult to form after the material is pyrolyzed so normally it will be desired to pyrolyze the material in pelletted form, if it is desired to use the semiconductor material in the form of a pellet. A binder, of course, can be used if desired in forming the pellet from the reaction product or the pyrolyzed reaction product.

The invention will be more clearly understood from the following detailed description of specific examples thereof:

Example 1

This example describes the preparation of pyromellitonitrile/ammonia reaction prroduct. A 20 gram sample of pyromellitonitrile and 2,000 ml. of absolute ethanol were heated to reflux. Then for a period of 1½ hours ammonia gas was passed into this reaction mixture. The reaction mixture became dark brown in color and was cooled while still passing ammonia into the mixture. The reaction was let stand overnight and filtered. A light green-colored residue was recovered. After drying this residue, 21 g. of dried material were recovered. When this material was heated to 280° C. it begins to turn green without melting. At 360° C. it turns dark green.

Example 2

This is another example describing the preparation of the pyromellitonitrile/ammonia reaction product. A sample of 10 g. of pyromellitonitrile and 500 ml. of methanol containing a trace of sodium were refluxed for one hour while passing ammonia gas through the reaction mixture. The reaction mixture was filtered hot, then the filtrate was concentrated and on cooling yielded 2.80 g. of yellow material. This yellow material starts coloring at 180° C., turns dark, dull green-black at 280° C. and does not melt at temperatures as high as 325° C. An elemental analysis of the yellow reaction product yielded the following results:

Calc'd for $C_{22}H_{15}N_{11}O$: C, 58.8%; H, 3.4%; N, 34.2. Found: C, 58.8%; H, 3.4%; N, 34.2%.

Example 3

A 2 g. sample of the yellow solid product of Example 2 was heated at 250° C. at 0.5 mm. of Hg pressure for 24 hours and at 350 C. at 0.05 mm. of Hg pressure for 24 hours to yield a black solid pyrolzed material. During this heating ammonia was split off. Analysis of this black solid product yielded the following results:

Calc'd for $C_{46}H_{19}N_{19}O_2$: C, 63.5%; H, 2.2%; N, 30.6%. Found: C, 63.5%; H, 2.2%; N, 30.6%.

This material is non-crystalline, infusible and insoluble, so direct structure proof would be extremely difficult.

Example 4

This example describes the measurement of the electrical properties of the black solid product of Example 3. The temperature-resistivity measurements were made in a ¾" diameter cylindrical quartz cell, the thickness of which could be varied from 0.7 to 5 mm. The quartz cell was fitted with a heater, platinum electrodes, and a thermocouple. The cell was covered by a bell jar connected to a gas inlet and vacuum system.

The sample in the form of a powder was placed in the cell holder and the electrodes attached under a constant spring tension. The bell jar system containing the sample in the cell was evacuated and then flushed with nitrogen. The sample was then heated for several hours at a point slightly below its melting or decomposition temperature under vacuum and then measurements were taken. The resistance of the sample was measured at various temperatures using a vibrating reed electrometer (resistance $>10^{12}$ ohms), a megohm bridge ($10^7$–$10^{12}$ ohms) or an RCA vacuum tube volt meter ($<10^7$ ohms). The resistance at the range limit of each instrument was checked carefully with the second instrument to insure correct readings.

Since some of the samples showed hysteresis effects, all measurements were taken as the temperature decreased.

From the electrical measurements of resistance and temperature on the black solid product of Example 3, $\rho_0$ was calculated to be $1.5 \times 10^{-3}$ ohm-cm. As is well known in the art $\rho_0$ is calculated from the following formula: $\rho = \rho_0 e^{-\Delta E/2kT}$. $\Delta E$ was determined to be 0.84 electron volt and $k$ is the Boltzmann constant.

What is claimed is:

1. Pyromellitonitrile/ammonia reaction product having a molar ratio of pyromellitonitrile to ammonia of about 1:2, said reaction product having been made by reacting pyromellitonitrile and ammonia at a temperature insufficient to cause substantial pyrolysis of the reaction product, as indicated by a darkening of the color of the reaction product.

2. A pyrolyzed reaction product of claim 1 having semiconductor properties and made by heating the reaction product of claim 1 at a temperature in the range of about 180–700° C. sufficient to drive off ammonia and for a time sufficient to produce a pyrolyzed product having improved semiconductor properties.

References Cited

UNITED STATES PATENTS 3,132,039   5/1964   Wildi _____ 117—36.8

JOSEPH L. SCHOFER, *Primary Examiner.*

J. KIGHT, *Assistant Examiner.*